US012264499B2

(12) United States Patent
Clifford et al.

(10) Patent No.: US 12,264,499 B2
(45) Date of Patent: Apr. 1, 2025

(54) KEY AND CORE WITH CAM BLOCKING

(71) Applicant: dormakaba USA Inc., Indianapolis, IN (US)

(72) Inventors: Jason Clifford, Noblesville, IN (US); Michael Hans Viklund, Indianapolis, IN (US)

(73) Assignee: dormakaba USA Inc., Indianapolis, IN (US)

( * ) Notice: Subject to any disclaimer, the term of this patent is extended or adjusted under 35 U.S.C. 154(b) by 632 days.

(21) Appl. No.: 17/475,091

(22) Filed: Sep. 14, 2021

(65) Prior Publication Data

US 2023/0082003 A1 Mar. 16, 2023

(51) Int. Cl.

*E05B 27/00* (2006.01)
*E05B 27/10* (2006.01)
*E05B 35/14* (2006.01)

(52) U.S. Cl.

CPC ........ *E05B 27/006* (2013.01); *E05B 27/0042* (2013.01); *E05B 27/10* (2021.08); *E05B 35/14* (2013.01)

(58) Field of Classification Search

CPC ............... E05B 27/006; E05B 27/0032; E05B 27/0035; E05B 27/0042; E05B 27/0057; E05B 27/0082; E05B 27/10; E05B 27/14; E05B 9/084; E05B 63/0056; E05B 35/083

USPC ............................................................ 70/369

See application file for complete search history.

(56) References Cited

U.S. PATENT DOCUMENTS 2,059,678 A * 11/1936 Briggs .................... E05B 9/086 70/216
3,485,068 A * 12/1969 Bennett ................. E05B 27/086 70/378
3,505,842 A 4/1970 Taylor
(Continued)

FOREIGN PATENT DOCUMENTS

DE 0507106 C 9/1930
DE 10050460 A1 4/2002
(Continued)

OTHER PUBLICATIONS

Espacenet machine translation of WO 96/41929 A1. (Year: 2024).*
(Continued)

*Primary Examiner* — Eugene G Byrd
*Assistant Examiner* — Emily G. Brown
(74) *Attorney, Agent, or Firm* — Faegre Drinker Biddle & Reath LLP

(57) ABSTRACT

A lock core includes a shell, a plug within and rotatable relative to the shell between a first position and a second position about a longitudinal axis of the plug, and a lock. The lock has a first locked position preventing rotation of the plug relative to the shell, an unlocked position allowing rotation of the plug relative to the shell and a second locked position different from the first locked position preventing rotation of the plug relative to the shell. The lock is moveable from the first locked position preventing rotation of the plug relative to the shell to the unlocked position with a first movement of the lock, the first movement having a vector component along the longitudinal axis of the plug and a vector component along an axis transverse to the longitudinal axis of the plug.

16 Claims, 11 Drawing Sheets

(56) References Cited

U.S. PATENT DOCUMENTS

| | | | | | |
|---|---|---|---|---|---|
| 3,599,455 | A * | 8/1971 | Pilvet | E05B 27/086 | 70/403 |
| 3,968,668 | A * | 7/1976 | Epstein | E05B 27/00 | 70/495 |
| 4,064,720 | A * | 12/1977 | Fry | E05B 27/086 | 70/378 |
| 4,715,201 | A * | 12/1987 | Craig | E05B 9/086 | 70/369 |
| 5,070,715 | A | 12/1991 | Smallegan et al. | | |
| 5,479,800 | A * | 1/1996 | Myers | E05B 35/008 | 70/370 |
| 5,615,565 | A | 4/1997 | Field | | |
| 5,615,566 | A | 4/1997 | Brandt | | |
| 5,819,566 | A | 10/1998 | Eden | | |
| 5,819,567 | A | 10/1998 | Eden | | |
| 5,823,030 | A | 10/1998 | Theriault et al. | | |
| 6,112,565 | A * | 9/2000 | Aramburu | E05B 9/084 | 70/360 |
| 6,508,091 | B1 | 1/2003 | Donatini | | |
| 6,526,791 | B2 * | 3/2003 | Shvarts | E05B 27/0035 | 70/495 |
| 6,758,074 | B1 | 7/2004 | Prunbauer | | |
| 6,981,396 | B1 * | 1/2006 | Kim | E05B 27/0082 | 70/369 |
| 8,448,485 | B1 * | 5/2013 | Widen | E05B 27/0017 | 70/494 |
| 10,125,519 | B1 * | 11/2018 | Gengler | E05B 47/0611 | |
| 12,077,984 | B2 | 9/2024 | Clifford et al. | | |
| 2002/0104346 | A1 | 8/2002 | Field et al. | | |
| 2003/0024287 | A1 * | 2/2003 | Field | E05B 19/0017 | 70/409 |
| 2005/0061043 | A1 | 3/2005 | Widen | | |
| 2005/0172688 | A1 | 8/2005 | Widen | | |
| 2006/0230797 | A1 * | 10/2006 | Strong | E05B 19/0017 | 70/371 |
| 2007/0051146 | A1 | 3/2007 | Recondo Carayalde et al. | | |
| 2008/0223097 | A1 | 9/2008 | Field et al. | | |
| 2008/0250830 | A1 | 10/2008 | Field et al. | | |
| 2009/0165514 | A1 | 7/2009 | Fredriksson et al. | | |
| 2009/0241620 | A1 | 10/2009 | Field et al. | | |
| 2010/0031716 | A1 | 2/2010 | Teixeira | | |
| 2010/0083718 | A1 | 4/2010 | Miyake | | |
| 2011/0252846 | A1 | 10/2011 | Hertel et al. | | |
| 2012/0240645 | A1 | 9/2012 | Mathachan | | |
| 2012/0240646 | A1 | 9/2012 | Herrmann | | |
| 2014/0190223 | A1 | 7/2014 | Field et al. | | |
| 2014/0223977 | A1 * | 8/2014 | Wu | E05B 27/0078 | 70/493 |
| 2015/0240525 | A1 * | 8/2015 | Walls | E05B 27/0053 | 70/447 |
| 2016/0376815 | A1 * | 12/2016 | Baver | E05B 27/0082 | 70/349 |
| 2017/0081880 | A1 * | 3/2017 | Artsiely | E05B 29/00 | |
| 2018/0355642 | A1 | 12/2018 | Cumbo et al. | | |
| 2020/0190855 | A1 | 6/2020 | Lai | | |
| 2024/0159081 | A1 | 5/2024 | Clifford et al. | | |

FOREIGN PATENT DOCUMENTS

| | | | | |
|---|---|---|---|---|
| DE | 10208893 | C1 * | 8/2003 | E05B 27/0035 |
| EP | 1662077 | A1 | 5/2006 | |
| EP | 2700775 | A2 | 2/2014 | |
| EP | 2770139 | A2 | 8/2014 | |
| EP | 3366870 | A1 | 8/2018 | |
| EP | 3366871 | A1 | 8/2018 | |
| EP | 3375956 | A1 | 9/2018 | |
| WO | WO-9641929 | A1 * | 12/1996 | E05B 27/001 |
| WO | 97/11244 | A1 | 3/1997 | |
| WO | 99/49161 | A1 | 9/1999 | |
| WO | 2014/005568 | A1 | 1/2014 | |
| WO | 2014/005569 | A2 | 1/2014 | |
| WO | 2014/071916 | A2 | 5/2014 | |
| WO | 2014/165949 | A1 | 10/2014 | |
| WO | 2017/157586 | A1 | 9/2017 | |
| WO | WO-2019020944 | A1 * | 1/2019 | E05B 19/0035 |

OTHER PUBLICATIONS

International Search Report and Written Opinion received for PCT Patent Application No. PCT/US2022/043415, mailed on Dec. 20, 2022, 12 pages.

International Preliminary Report on Patentability received for PCT Patent Application No. PCT/US2022/043415, mailed on Mar. 28, 2024, 10 pages.

Espacenet machine translation of DE 507106 C, generated Apr. 18, 2024. (Year: 2024).

* cited by examiner

KEY AND CORE WITH CAM BLOCKING

TECHNICAL FIELD

The present disclosure relates to key and lock cores and in particular to interchangeable lock cores having cam blocking.

BACKGROUND

Various examples are established in the art for providing an interchangeable lock core with blocking means to validate a key and allow for locking or unlocking of the lock core. It may be beneficial to incorporate means of validating the key in order to reduce instances of unlocking or locking of the interchangeable lock core through a key or other mechanism that has not been authorized for use with the interchangeable lock core. For example, the lock core may comprise various pins that are actuated by the key for placement into an unlocked position when the pins are properly engaged by the profile of the key. If the key profile fails to engage the pins properly the key is not validated, and the lock core is not unlocked. In other examples, elements may be incorporated into the lock core that block the key from being inserted into the keyway unless it has an engagement feature that permits full insertion of the key and bypasses the blocking.

There remains a need for an interchangeable lock core for unlocking and/or locking a barrier having additional improvements relative to security.

SUMMARY

In embodiments, an interchangeable lock core for use with a lock device having a locked state and an unlocked state is provided.

In a first example ("Example 1"), a lock core includes a shell, a plug positioned within and rotatable relative to the shell between a first position and a second position about a longitudinal axis of the plug, and a lock. The lock has a first locked position preventing rotation of the plug relative to the shell, an unlocked position allowing rotation of the plug relative to the shell and a second locked position different from the first locked position preventing rotation of the plug relative to the shell, the lock moveable from the first locked position preventing rotation of the plug relative to the shell to the unlocked position with a first movement of the lock, and the first movement having a vector component along the longitudinal axis of the plug and a vector component along an axis transverse to the longitudinal axis of the plug.

In a second example ("Example 2"), the lock core of Example 1 further includes wherein the lock is sequentially moveable from the first locked position preventing rotation of the plug relative to the shell to the unlocked position allowing rotation of the plug relative to the shell and thereafter to the second locked position preventing rotation of the plug relative to the shell.

In a third example ("Example 3"), the lock core of Example 1 further includes wherein the first movement of the lock comprises a rotation about a lateral axis of the lock.

In a fourth example ("Example 4"), the lock core of Example 1 includes wherein the lock includes a rocker and the rocker is sequentially rotatable between the first locked position preventing rotation of the plug relative to the shell, the unlocked position allowing rotation of the plug relative to the shell, and the second locked position preventing rotation of the plug relative to the shell.

In a fifth example ("Example 5"), the lock core of Example 1 in combination with a key includes wherein the plug further includes a keyway, and the key includes a shank insertable into the keyway.

In a sixth example ("Example 6"), the lock core of Example 5 includes wherein the plug includes a lock passage and the lock core comprises a lock actuator assembly. The lock actuator assembly includes a block, a pin extending from the lock, a rod, and a spring. The block, the rod, the pin and the spring are positioned within the lock passage of the plug and longitudinally aligned, and the spring supplies a biasing force to the block to bias the lock to the first locked position.

In a seventh example ("Example 7"), the lock core of Example 6 includes the shank having a groove and a shoulder, wherein the groove extends a length that is less than a length of the shank and has a cross-section configured for receiving a portion of the rod.

In an eighth example ("Example 8"), the lock core of Example 7 includes wherein the shank of the key comprises a groove and a shoulder, the groove extends a length that is less than a length of the shank and has a cross-section configured for receiving a portion of the rod.

In a ninth example ("Example 9"), the lock core of Example 1 includes wherein the lock is moveable from the unlocked position to the second locked position with a second movement of the lock, the second movement having a second movement vector component along the longitudinal axis of the plug and a second movement vector component along an axis transverse to the longitudinal axis.

In a tenth example ("Example 10"), the lock core of Example 1 includes wherein the shell comprises a lock receiver and in the first locked position a first end of the lock extends into the lock receiver, in the unlocked position the lock does not extend into the lock receiver, and in the second locked position a second end of the lock extends into the lock receiver.

In an eleventh example ("Example 11"), the lock core of Example 1 further includes the shell including an upper region having a first cylindrical portion with a first maximum lateral extent, a lower region having a second cylindrical portion with a second maximum lateral extent, and a waist having a third maximum lateral extent, the third maximum lateral extent being less than the first maximum lateral extent and being less than the second maximum lateral extent.

In a twelfth example, ("Example 12"), a lock core includes a shell, a plug positioned within and rotatable relative to the shell between a first position and second position about a longitudinal axis of the plug, a rocker, the rocker rotatable about a lateral axis of the lock between a first locked position preventing rotation of the plug relative to the shell, an unlocked position allowing rotation of the plug relative to the shell, and a second locked position different from the first locked position preventing rotation of the plug relative to the shell.

In a thirteenth example ("Example 13"), the lock core of Example 12 includes wherein the shell includes an upper region having a first cylindrical portion with a first maximum lateral extent, a lower region having a second cylindrical portion with a second maximum lateral extent, and a waist having a third maximum lateral extent, the third maximum lateral extent being less than the first maximum lateral extent and being less than the second maximum lateral extent.

In a fourteenth example ("Example 14"), the lock core of Example 12 includes wherein the first locked position defines a proximalmost position within a range of motion of the rocker relative to a front surface of the plug and the second locked position defines a distalmost position relative to the front surface of the plug within a range of motion of the rocker.

In a fifteenth example ("Example 15"), the lock core of Example 14 includes wherein the movement of the rocker from the first locked position to the unlocked position to the second locked position includes a sequential rotation of the rocker through the range of motion.

In a sixteenth example ("Example 16"), the lock core of Example 12 includes the shell including a lock receiver and the plug including a lock passage, the rocker being positioned within the lock passage.

In a seventeenth example ("Example 17"), the lock core of Example 16 includes wherein the rocker has a first end, a second end, and a bottom surface extending between the first and second end.

In an eighteenth example ("Example 18"), the lock core of Example 17 includes wherein in the first locked position the first end extends into the lock receiver and the second end does not extend into the lock receiver, in the unlocked position the lock does not extend into the lock receiver, and in the second locked position the second end extends into the lock receiver and the first end does not extend into the lock receiver.

In a nineteenth example ("Example 19"), the lock core of Example 12 further includes wherein the plug includes a lock passage for receiving the rocker and the lock core includes a lock actuator assembly. The lock actuator assembly includes a block, a pin extending from the rocker, a rod, and a spring. The rod is biased by the spring and actuation of the rod causes movement of the lock.

In a twentieth example ("Example 20"), the lock core of claim 19, in combination with a key, includes wherein the plug includes a keyway for receiving the key, the key includes a shank having a groove, and the groove has a length that is less than a length of the shank and a cross-section configured for engagement with the rod of the lock actuator assembly.

In a twenty-first example ("Example 21"), a method of unlocking a barrier includes inserting a key into a keyway of a lock core, the inserting step actuating a lock from a first locked position preventing rotation of a plug within a shell to an unlocked position allowing rotation of the plug within the shell, the lock moveable to a subsequent, second locked position preventing rotation of the plug within the shell, wherein actuating the lock from the first locked position to the unlocked position includes a first movement of the lock, and the first movement of the lock having a vector component along the longitudinal axis of the plug and a vector component along an axis transverse to the longitudinal axis of the plug. The method further includes rotating the plug within the shell.

In a twenty-second example ("Example 22"), the method of Example 21 includes wherein the key includes a shank having a groove defining a shoulder that engages with a pin of the lock to actuate the lock from the first locked position to the unlocked position during the inserting step.

In a twenty-third example ("Example 23"), the method of Example 21 includes wherein the shell includes an upper region having a first cylindrical portion with a first maximum lateral extent, a lower region having a second cylindrical portion with a second maximum lateral extent, and a waist having a third maximum lateral extent, the third maximum lateral extent being less than the first maximum lateral extent and being less than the second maximum lateral extent.

In a twenty-fourth example ("Example 24"), a key includes a key bow, a key shank extending from the key bow along a longitudinal axis, the key shank having an exterior profile extending along a length of the key shank, and a groove extending along the key shank and in a direction along a longitudinal axis of the key shank. The groove has a length that is less than the length of the key shank.

In a twenty-fifth example ("Example 25"), the key of Example 24 includes wherein the groove has a cross-sectional profile orthogonal to the longitudinal axis that is defined by a plurality of intersecting flats.

In a twenty-sixth example ("Example 26"), the key of Example 25 further includes a lock core, wherein the groove is configured for receiving at least a portion of an actuator assembly of the lock core for actuating the lock core from a locked state to an unlocked state.

In a twenty-seventh example ("Example 27"), the key of Example 26 further includes the lock core comprising a shell having an upper region having a first cylindrical portion with a first maximum lateral extent, a lower region having a second cylindrical portion with a second maximum lateral extent, and a waist having a third maximum lateral extent, the third maximum lateral extent being less than the first maximum lateral extent and being less than the second maximum lateral extent.

In a twenty-eighth example ("Example 28"), a method of forming a key from a key blank includes engaging a cutting tool with at least one side of the key blank, the cutting tool oriented in a direction transverse to a longitudinal axis of the key, moving the cutting tool along the key blank for a distance that defines a length of the groove, the length of the groove being less than a length of the key shank, and removing the cutting tool from engagement with the at least one side of the key blank in the direction transverse relative to the longitudinal axis.

In a twenty-ninth example ("Example 29"), the method of Example 28 includes wherein engaging the cutting tool includes orienting the cutting tool in a direction orthogonal to the longitudinal axis of the key.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
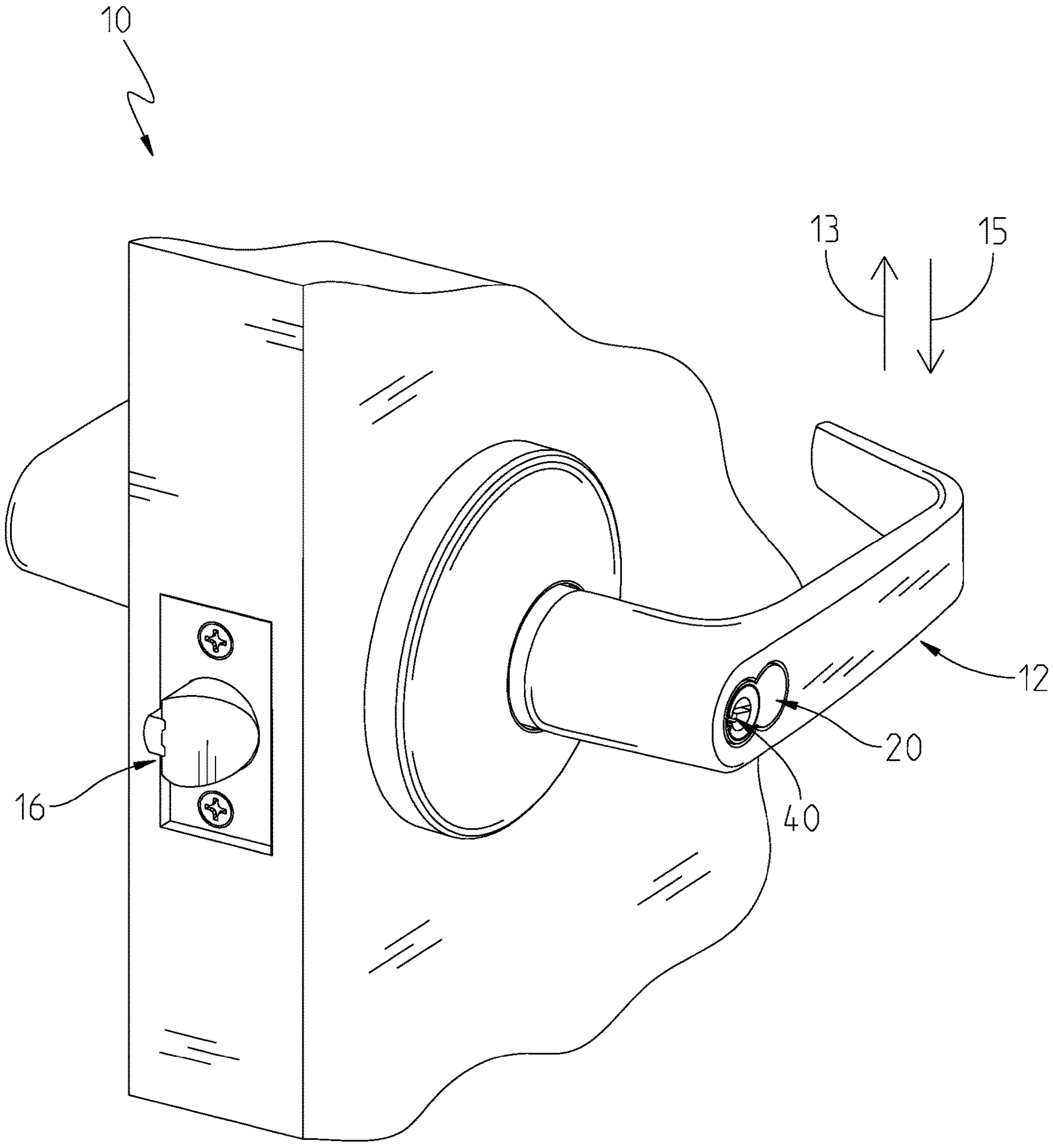
FIG. 1 is a front perspective view of a barrier with a handle having an interchangeable lock.

For the purposes of promoting an understanding of the principles of the present disclosure, reference is now made to the embodiment illustrated in the drawings, which is described below. The embodiment disclosed herein is not intended to be exhaustive or limit the present disclosure to the precise form disclosed in the following detailed description. Rather, the embodiment is chosen and described so that others skilled in the art may utilize its teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances, throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

FIG. 1 illustrates a barrier in the form of door 10 comprising handle 12 having lock core 20 and retractable latch 16. In various embodiments, retractable latch 16 is retracted with actuation of handle 12 in upward direction 13 or downward direction 15. Retractable latch 16 can be retracted through actuation of handle 12 only when handle 12 is an unlocked configuration, which is controlled by lock core 20 being in an unlocked state. The locking or unlocking of lock core 20 may be actuated through the use of key 32 (FIG. 2) inserted into keyway 40 of lock core 20, as will be described further herein. Additionally, lock core 20 may be a small format interchangeable core (SFIC), providing the additional benefit of lock core 20 being configured to be removed and replaced in handle 12 with use of a control pin, for example.

Figure 2:
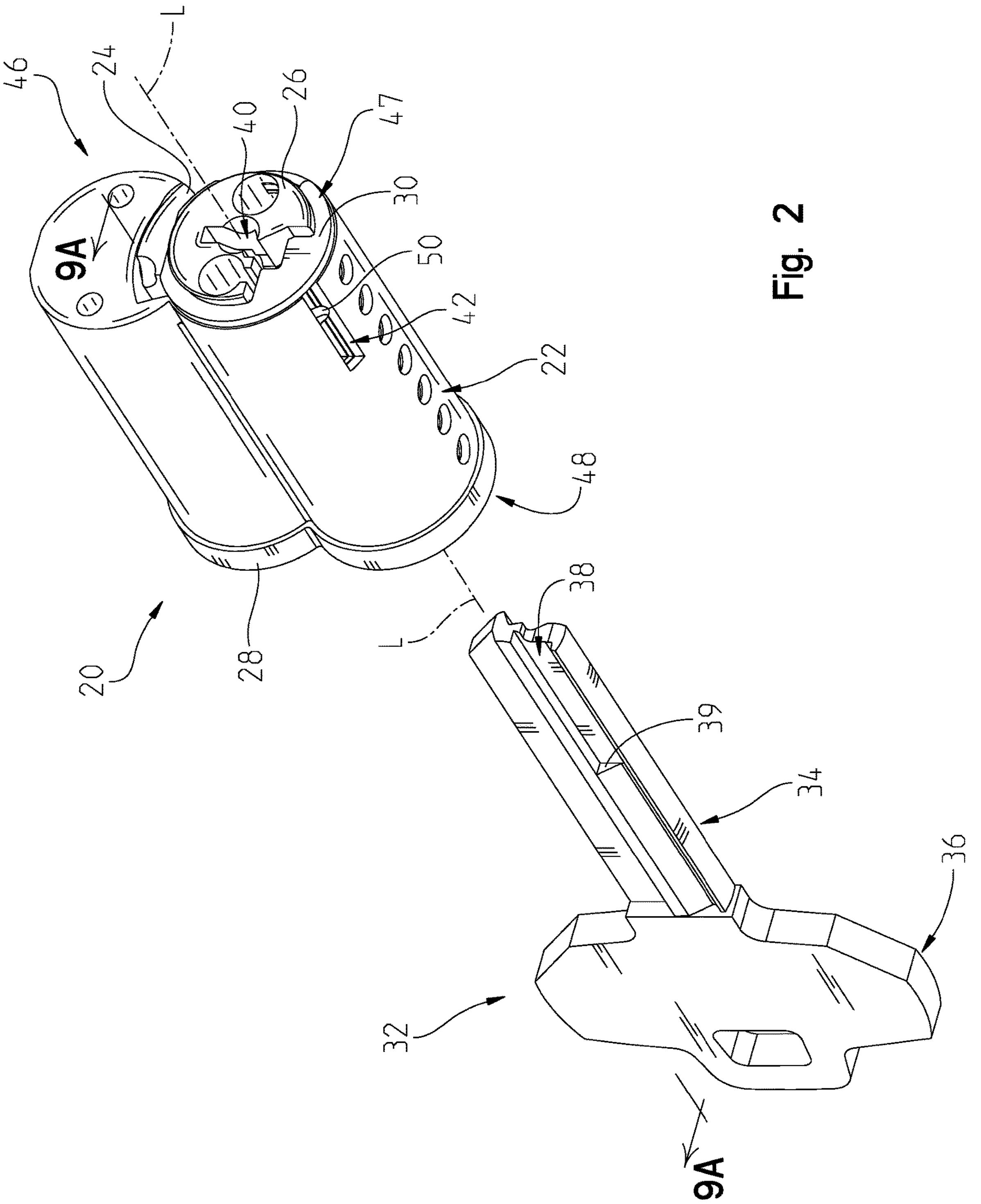
FIG. 2 is a perspective view of an interchangeable lock core and a key.

According to the present disclosure, lock core 20 is provided including a pin tumbler assembly (not shown) comprising a plurality of pin tumblers (not shown) and a secondary system that additionally verifies the access rights of a key/key blank/key body 32, illustratively disclosed in FIGS. 2-11 and the corresponding descriptions herein. FIG. 2 is a bottom left perspective view of lock core 20 and key 32. Key 32 is used for actuating lock core 20 from the locked state to the unlocked state and vice versa, based on insertion and actuation of key 32 as described further herein. Key 32 comprises key shank 34 and key bow 36. Key shank 34 comprises an exterior profile configured to engage with a profile of keyway 40 of lock core 20 and actuate the pin tumbler assembly. The pin tumbler assembly functions such that when the exterior profile of key shank 34 is fully engaged within keyway 40 of lock core 20 (i.e., with key 32 fully inserted in keyway 40), the plurality of pin tumblers is positioned at a shear line allowing in part for lock core 20 to be in the unlocked state. More specifically, with an appropriate key 32 inserted into keyway 40, the pin tumblers no longer resist rotation of plug 26 within shell 22.

Figure 3:
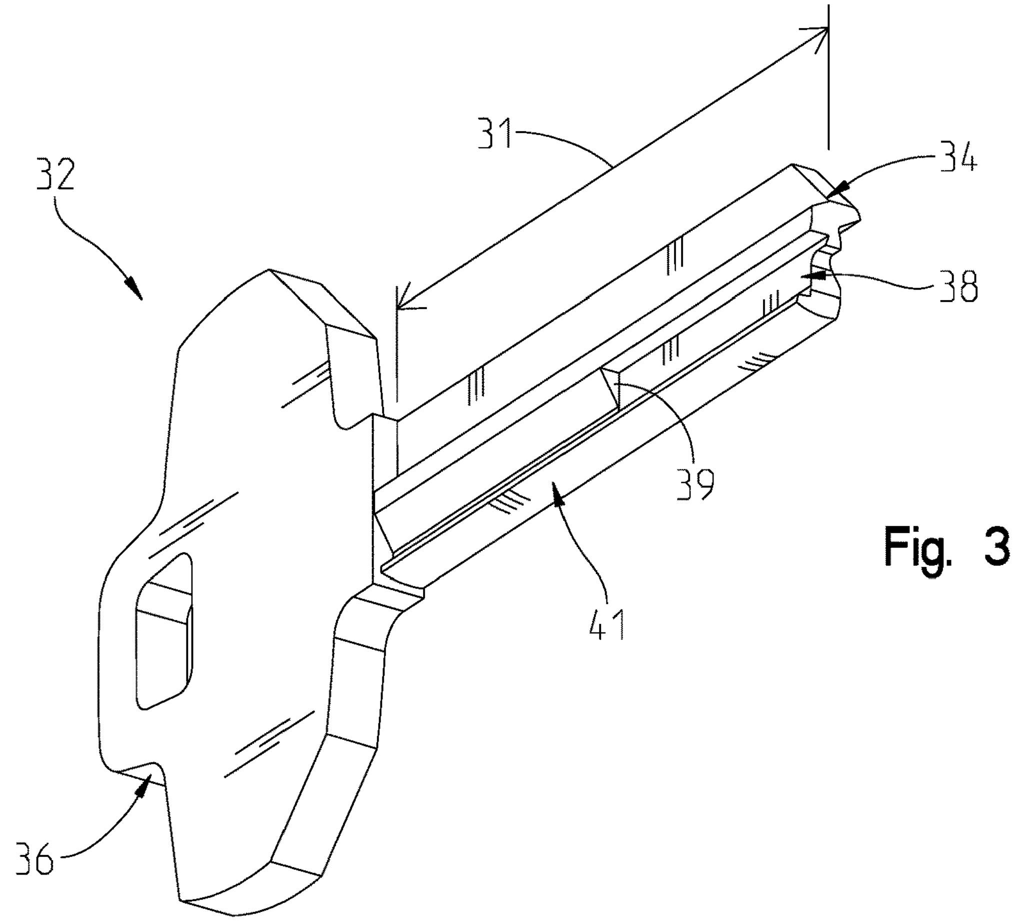
FIG. 3 is a perspective view of the key of FIG. 2.

As illustrated in FIGS. 2 and 3, key 32 includes key shank 34 and key bow 36. Key shank 34 includes groove 38 and shoulder 39. Key bow 36 is defined by a width extending generally transverse to longitudinal axis A that is greater than a length of key bow 36 extending along (nominally coincidental with or nominally parallel to) longitudinal axis A. Key shank 34 is defined by a width that extends generally transverse to longitudinal axis A that is less than a length 31 of key shank 34 that extends along (nominally coincidental with or nominally parallel to) longitudinal axis A. The width of key shank 34 is approximately consistent along length 31 of key shank 34. Further, key shank 34 comprises at least two sides, illustratively a right side 35 and a left side 37 (FIG. 5B), a top surface (not shown), and a bottom surface 41. Right side 35 may be positioned opposite left side 37 and top surface may be positioned opposite bottom surface 41.

In FIGS. 2 and 3, the external profile has been cut into key blank 32, while groove 38 has been maintained in key shank 34. This is in contrast to key blank 32 shown in FIG. 4, wherein groove 38 is present but the external profile has not yet been cut. With reference to FIGS. 2 and 3, the external profile extends along an entirety of length 31 of key shank 34 and may be cut into key 32 through various methods, including but not limited to, milling, grounding, and other applicable machining processes. The external profile is sized and shaped to be compatible with lock core 20 such that key 32 can be inserted into lock core 20 and the exterior profile may engage with the pin tumbler assembly (not shown). The external profile is machined in a way such that groove 38 and shoulder 39 are not impeded or changed by the external profile. Groove 38 and shoulder 39 are configured such that after insertion of key 32, groove 38 is capable for receiving an element, such as a rod, of lock core 20 without impeding full insertion of key 32, and shoulder 39 is capable of acting as a barrier for the element, or rod, of lock core 20, as will be described further herein with reference to FIG. 8. In various embodiments, shoulder 39 is specifically defined by the proximal most end of the wall defining groove 38 in key shank 34. In various embodiments, for example the illustrative embodiment of FIG. 2, each of groove 38 and shoulder 39 have a triangular cross-section. In other embodiments, the cross-section of groove 38 may be circular, semi-circular, rectangular or have an otherwise irregular shape. The cross-sectional shape of groove 38 may be chosen to be such that it is able to engage with a corresponding portion of lock core 20, as will be described further with reference to FIG. 8. In further embodiments, shoulder 39 may be a relative pocket within groove 38 rather than proximal most surface of groove 38.

Figure 4:
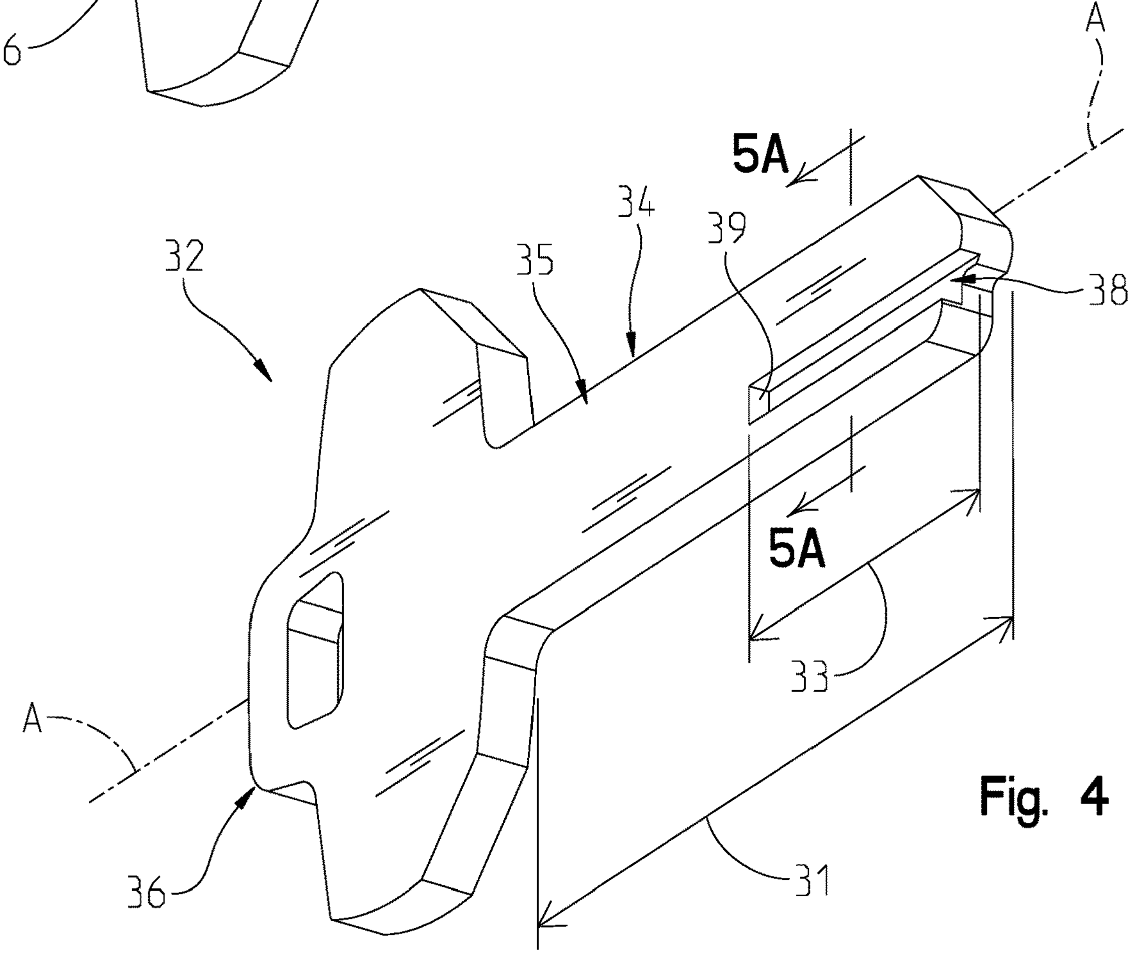
FIG. 4 is a perspective view of a key blank of the key of FIG. 2.

FIG. 4 illustrates a perspective view of a key blank of key 32, wherein key 32 comprises groove 38 and shoulder 39, but key 32 has not been milled, ground, or otherwise machined to comprise the exterior profile for engaging the pin tumbler assembly (not shown). Groove 38 has length 33 along key shank 34 that extends only part of the length of key shank 34, such that length 33 of groove 38 is less than length 31 of key shank 34. Length 33 of groove 38 extends along (nominally coincidental with or nominally parallel to) longitudinal axis A of key shank 34. For example, length 33 may have a value that is 50% of length 31 of key shank 34. In various other embodiments, length 33 may have a value that is 55%, 60%, 65%, 70%, or 75% of length 31 of key shank 34. In further embodiments, length 33 may be between 80% and 95% of length 31. In some embodiments, length 33 of groove 38 has a value that is 20%, 25%, or 30% of length 31 of key shank 34. The above described percentages are non-limiting examples of dimensions of length 33, and a variety of other dimensions may be used for length 33 of groove 38. For example, length 33 may have a value of between 10% to 90% of length 31.

Groove 38 may be formed through various methods, such as, but not limited to, 3-D printing, end-milling, or side-milling. Groove 38 may be formed with a cutting tool that is configured for creating nominal flats. For example, in various embodiments, groove 38 is formed through engaging at least one side of key shank 34 with a cutting tool, for example an end mill, the cutting tool oriented transverse to longitudinal axis A of key shank 34. While FIGS. 4-5B illustrate wherein the cutting tool has engaged right side 35 of key shank 34, in various other embodiments, cutting tool may engage left side 37 of key shank 34 for forming groove 38. The cutting tool engages the at least one side of key shank 34 and moves along key shank 34 while maintaining engagement. In these embodiments, the cutting tool removes material from key shank 34 at the points of engagement or contact with key shank 34. In these embodiments, for example wherein the end mill is used, a flat may be formed along a back surface of groove 38. As the end mill is moved along longitudinal axis A, nominal flats may be formed along top and bottom surfaces of groove 38, thus creating the intersecting nominal flats defining groove 38. In various embodiments, the cutting tool may be oriented nominally parallel to longitudinal axis A. Additionally, the shape of groove 38 may be governed by the shape of an end portion of the cutting tool that is engaged with key shank 34. The cutting tool is extended along key shank 34 for a length that defines length 33 of groove 38. In this way, length 33 of groove 38 along longitudinal axis A can be varied and customized to a desired length that will allow for compatibility with interchangeable lock core 20, and the shape of cross-sectional groove 38 can be varied through variations in the cutting tool.

Figure 5A:
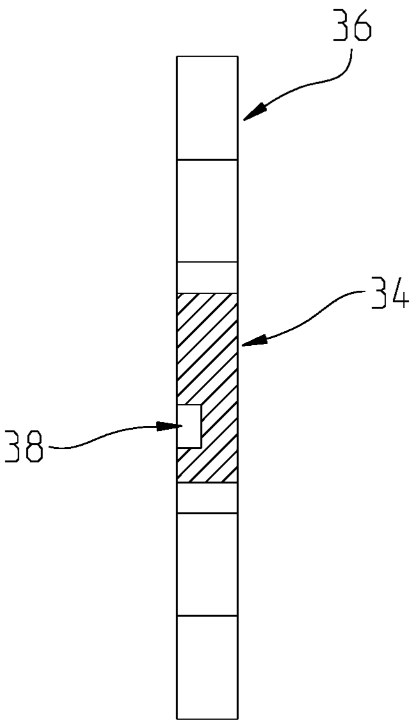
FIG. 5A is a cross-sectional view of the key blank of FIG. 4 taken along line 5A-5A thereof.
Figure 5B:
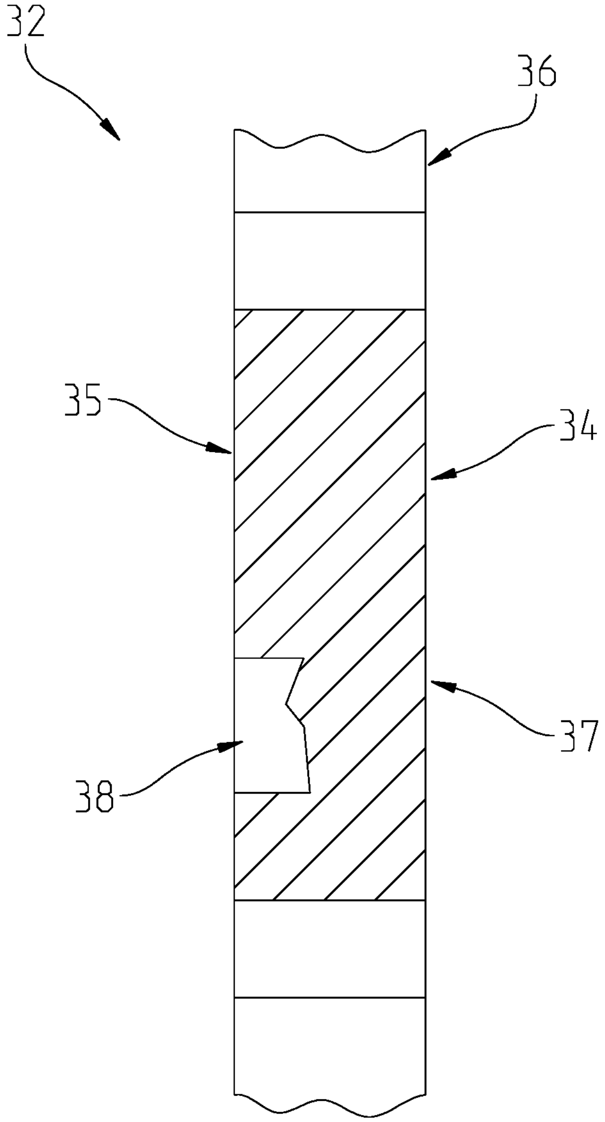
FIG. 5B is a cross-sectional view of a variation of the key blank of FIG. 4.

FIG. 5A illustrates a cross-sectional view of key 32 of FIG. 4 taken along line 5A-5A thereof. As previously described with reference to FIG. 4, groove 38 comprises a generally rectangular shaped cross-section defined by intersecting, linearly extending flats. In various embodiments, the cross-section may be of a varying shape, for example, square, circular, triangular or any other irregular shape. For example, FIG. 5B illustrates a cross-section of an additional embodiment of key 32 wherein the cross-sectional shape of groove 38 is irregularly shaped and also defined by a plurality of intersecting nominal flats. Further, as illustrated in the cross-sectional views of FIGS. 5A and 5B, the cross-section of groove 38 taken orthogonally to longitudinal axis A (FIG. 4) defines at least one nominal flat extending at least partially along length 33 (FIG. 4) of groove 38. While groove 38 is generally continuous through length 33 of groove 38, there may be a pocket, barrier, shoulder or indent within groove 38. The shape and length 33 of groove 38 is manufactured for proper engagement with security rod 64 (FIG. 4) of lock core 20, as will be described further with reference to FIG. 8-9C. While shoulder 39 is illustrated in at least FIGS. 3-5B as having a generally flat surface shape, shoulder 39 may vary in shape based on the method of formation of groove 38 and shoulder 39. For example, the surface of shoulder 39 may be generally arcuate or curved. While the shape or configuration of shoulder 39 may vary, shoulder 39 must be configured to act as a barrier for security rod 64 such that security rod 64 does not move relative to key 32 once in contact with shoulder 39, as will be described further with reference to FIG. 8.

Figure 6:
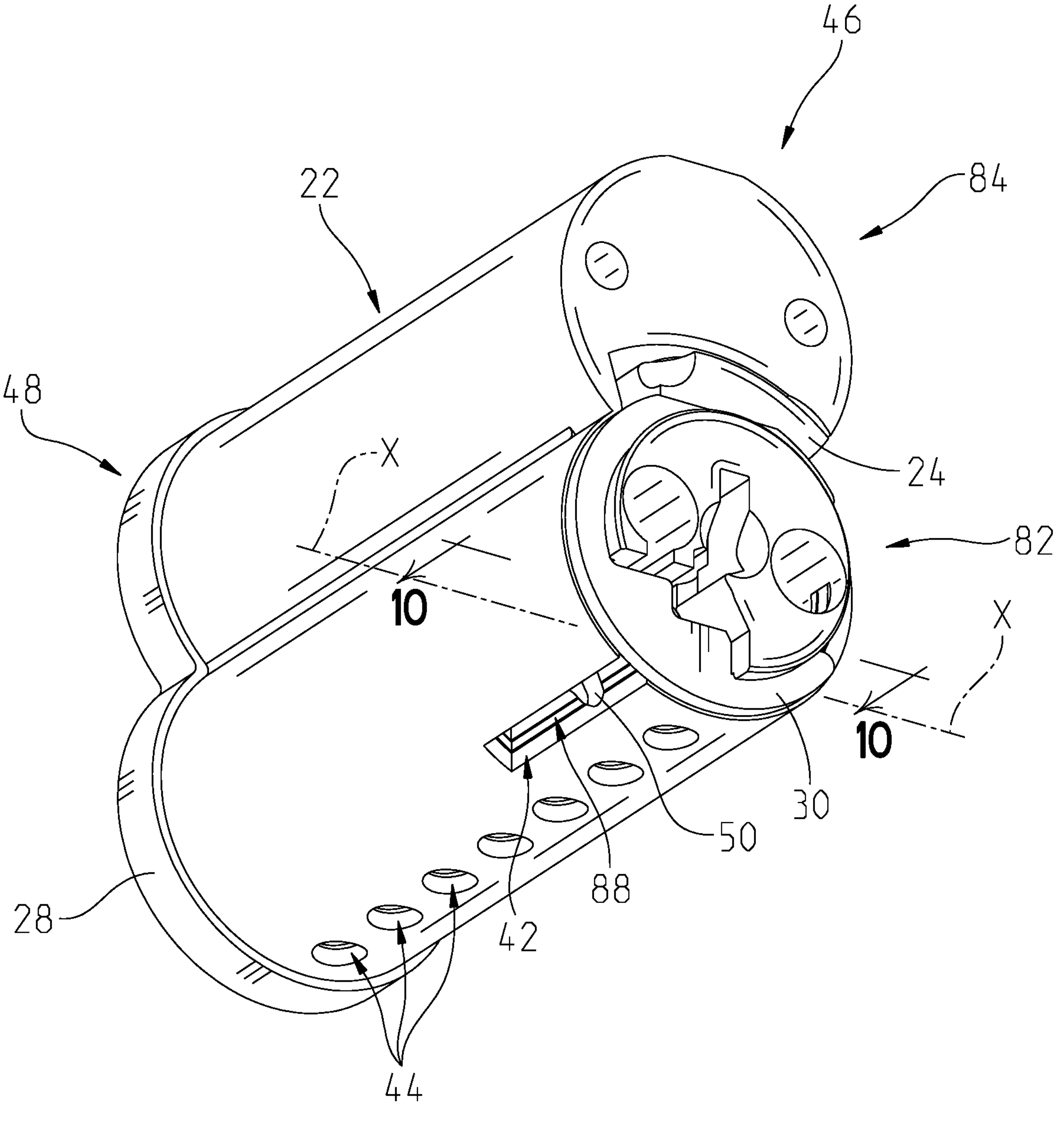
FIG. 6 is another perspective view of the interchangeable lock core of FIG. 2.

As illustrated in FIGS. 2 and 6-8, lock core 20 is elongate along longitudinal axis L between distal end 46 and proximal end 48. Lock core 20 comprises rear surface 47 at distal end 46 (FIG. 6) and front surface 49 (FIG. 9A) at proximal end 48 (FIG. 6). Lock core 20 features shell 22, core sleeve 24, plug 26, face plate 28, and core clip 30. Shell 22 includes a bottom surface having a lock receiver 42 for receiving a lock or a blocker (exemplified as rocker 50) of lock core 20 and a plurality of openings 44 for receiving the pin tumbler assembly (not shown). As described previously with reference to FIG. 1, the pin tumbler assembly is configured such that when key 32 is fully engaged within keyway 40, the pin tumblers are actuated to be positioned at a shear line allowing plug 26 to be rotated within shell 22 from a first position to a second position of plug 26. Core sleeve 24 may also comprise lock receiver 88 for receiving rocker 50 of lock core 20 such that rocker 50 may extend through lock receiver 88 of core sleeve 24 and lock receiver 42 of lock core 20. Plug 26 is positioned within shell 22 and is rotatable relative to shell 22 between the first position and the second position about longitudinal axis L (i.e., between a locked position preventing rotation of handle 12 to actuate retractable latch 16 and an unlocked position allowing rotation of handle 12 to actuate retractable latch 16 to allow ingress and egress through door 10). Face plate 28 is positioned at proximal end 48 of lock core 20 and is flush with shell 22 and plug 26 of lock core 20.

Figure 7:
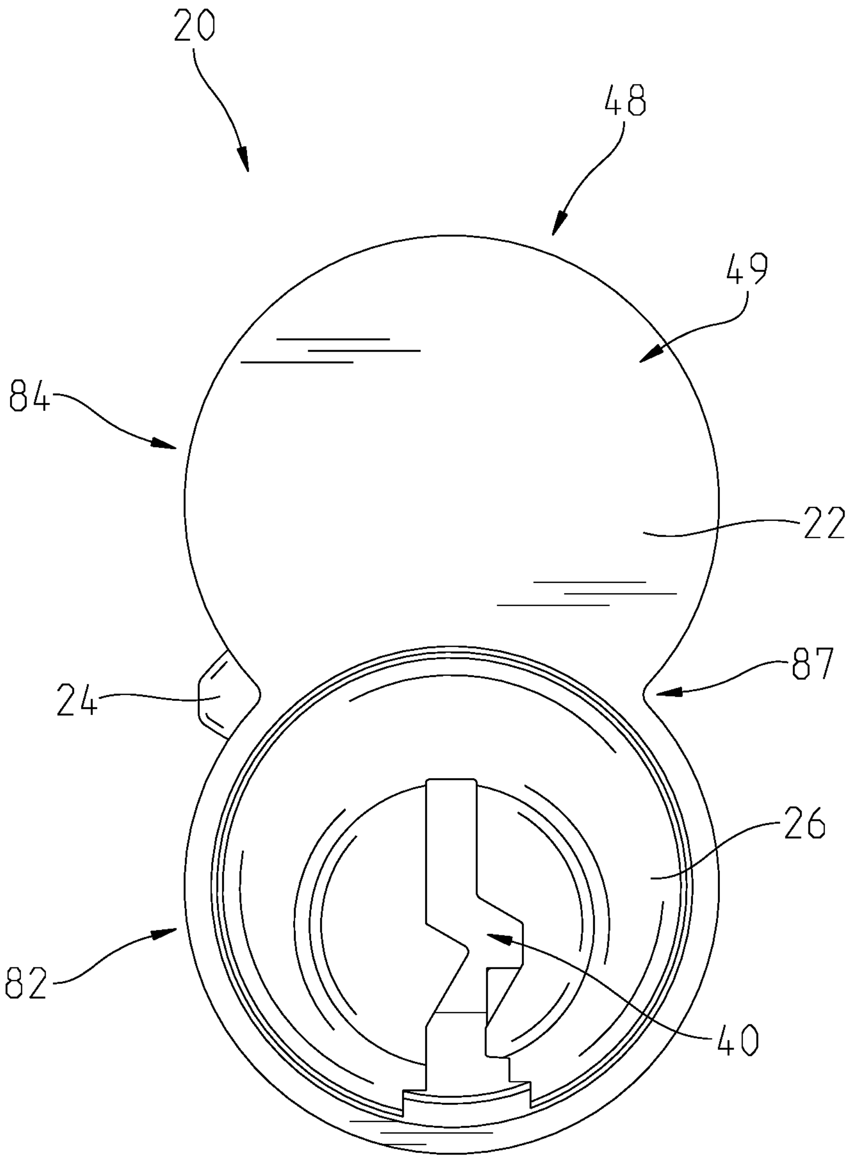
FIG. 7 is a front view of the interchangeable lock core of FIG. 2.

FIG. 7 illustrates a front view of lock core 20, illustrating front surface 49 at proximal end 48 of lock core 20. As illustrated in FIGS. 6 and 7, shell 22 surrounds at least a portion of sleeve 24 and plug 26. Shell 22 defines a figure eight profile which is received in a corresponding figure eight profile of faceplate 28. Shell 22 includes an upper region 84 having a first cylindrical portion with a first maximum lateral extent, a lower region 82 having a second cylindrical portion with a second maximum lateral extent, and a waist 87 having a third maximum lateral extent. In various embodiments, the third maximum lateral extent is less than the first maximum lateral extent and less than the second maximum lateral extent. As illustrated, in various embodiments, sleeve 24 comprises a portion extending from the waist 87 of shell 22. The figure eight profile is known as a small format interchangeable core ("SFIC"). Shell 22 may also be sized and shaped to be compatible with large format interchangeable cores ("LFIC") and other known cores.

Figure 8:
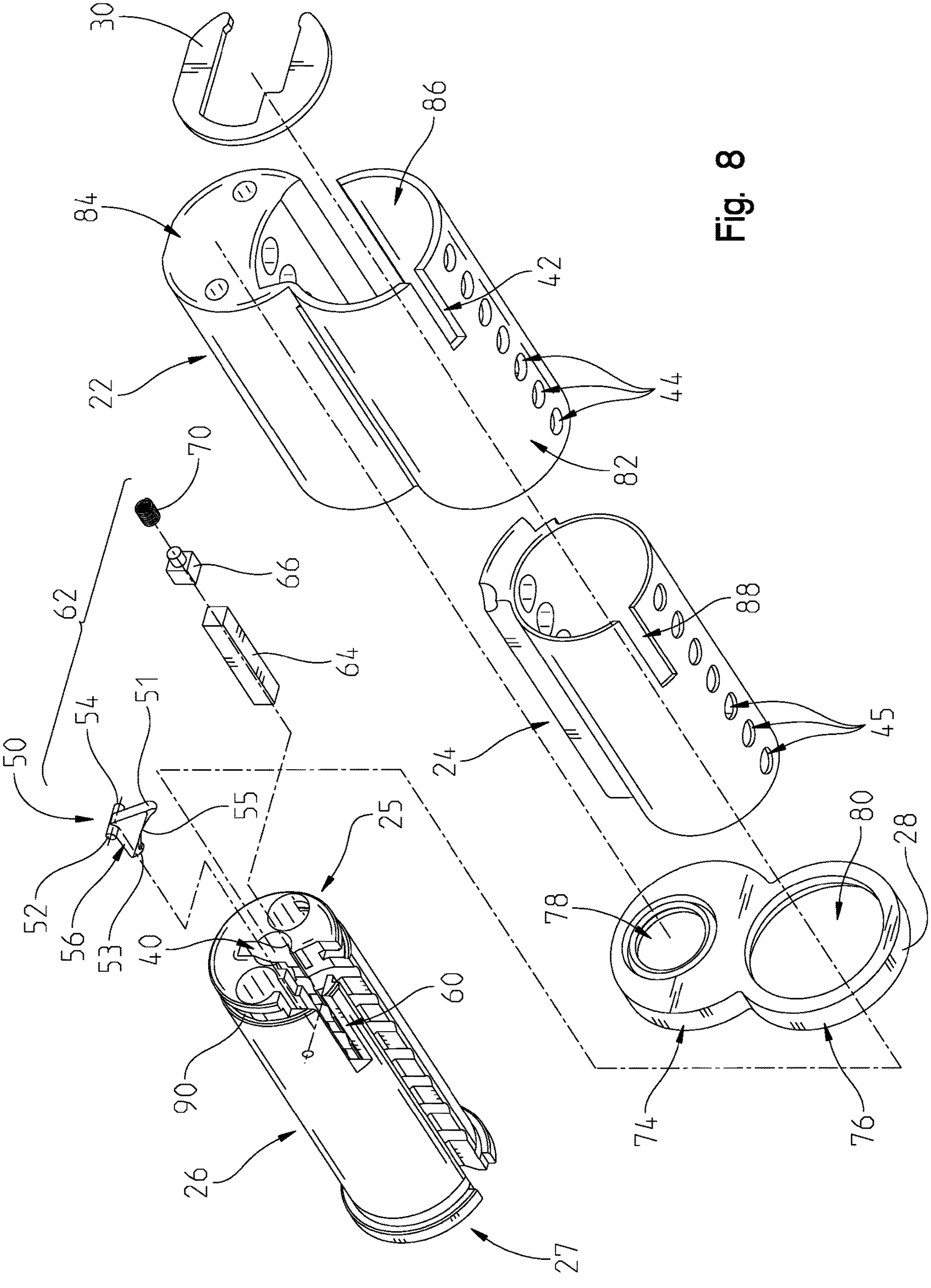
FIG. 8 is an exploded, perspective view of the interchangeable lock core of FIGS. 2 and 3.

FIG. 8 is an exploded view of lock core 20 and illustrates the assembly of lock core 20. Plug 26 comprises distal end 25 and proximal end 27. As illustrated, plug 26 comprises keyway 40 and a lock passage exemplified as rocker passage 60, for receiving rocker 50 and lock actuator assembly 62. Lock actuator assembly 62 comprises rocker 50, a rod exemplified as a security rod 64, block 66 comprising a protrusion, and a biasing element exemplified as spring 70 configured to be received over the protrusion of block 66 and configured to bias block 66. In embodiments, rocker 50 is a monolithic and one piece assembly. Rocker 50 comprises first end 51, second end 53, and bottom surface 55 extending between first end 51 and second end 53. In various embodiments, at least a portion of bottom surface 55 is relatively linear. Rocker 50 additionally includes first arm 52 on first side 56 of rocker 50, and second arm 54 on a second side (not shown) of rocker 50. On second side of rocker 50, rocker 50 additionally comprises pin 59 (FIGS. 9A, 9B, and 9C) extending outward from second side of rocker 50.

In assembly, security rod 64 is inserted into a first portion of rocker passage 60. Rocker 50 is inserted into a second portion of rocker passage 60 laterally adjacent to security rod 64. Rocker passage 60 is configured such that upon insertion of security rod 64 and block 66, rocker passage 60 only permits movement along (i.e., coincidental with or parallel to) longitudinal axis L and prohibits movement of security rod 64 and block 66 in a direction transverse to longitudinal axis L. Additionally, towards a proximal end of rocker passage 60, there may be an opening between rocker passage 60 and keyway 40 which allows for a portion of security rod 64 to protrude into keyway 40. As such, security rod 64 is configured to protrude into keyway 40 to be accessible for engagement with key 32 (FIG. 2), as will be discussed further with reference to FIGS. 9A-9C.

Upon insertion, first arm 52 and second arm 54 are rotationally supported through various openings of plug 26 so that rocker 50 is pivotally connected to plug 26 about the shared longitudinal axes of arms 52, 54. Pin 59 (FIG. 9A) of rocker 50 extends into a region longitudinally aligned with and directly adjacent to a proximal surface of security rod 64, as will be illustrated further in FIGS. 9A-9C. Block 66 is inserted within the first portion of rocker passage 60 longitudinally adjacent and proximal to security rod 64 such that pin 59 of rocker 50 is sandwiched between security rod 64 and block 66. Spring 70 is positioned at least partially over the protrusion of block 66. As such, spring 70 is configured to bias block 66 and rocker 50. While described herein as spring 70, the biasing element may include various other mechanism for biasing block 66.

With continued reference to FIG. 8, proximal end 27 of plug 26 is inserted onto face plate 28 such that face plate 28 is coupled to and positioned at least partially around proximal end 27 of plug 26. Face plate 28 includes a "figure-8" shape, having upper region 74 and lower region 76, upper region 74 having first opening 78 and lower region 76 having second opening 80, such that plug 26 is received within second opening 80 of face plate 28. In various embodiments, face plate 28 additionally comprises a counterbore such that face plate 28 and plug 26 are flush. Core sleeve 24 is inserted over distal end 25 of plug 26 until it surrounds plug 26 and is received at least in part by face plate 28. Core sleeve 24 comprises lock receiver 88 and is positioned such that lock receiver 88 of core sleeve 24 is aligned with at least the second portion of rocker passage 60 of plug 26 such that rocker 50 may extend out of rocker passage 60 and into lock receiver 88 of core sleeve 24. Core sleeve 24 also comprises a plurality of openings 45 for receiving the plurality of pin tumblers of the pin tumbler assembly.

Shell 22 is inserted over core sleeve 24 and plug 26 until shell 22 abuts face plate 28. As previously described with reference to FIG. 7, an outer perimeter of shell 22 comprises a "figure-8" shape corresponding to that of face plate 28. As such, shell 22 includes lower region 82 and upper region 84. Lower region 82 comprises lower opening 86 for receiving and surrounding plug 26. Upper region 84 of shell 22 abuts upper region 74 of face plate 28 and lower region 82 abuts lower region 76 of face plate 28. In these embodiments, both plug 26 and shell 22 are flush with face plate 28. As previously mentioned, shell 22 comprises the plurality of openings 44 for receiving the pin tumblers of the pin tumbler assembly and lock receiver 42 for receiving rocker 50 of lock actuator assembly 62, as will be described further herein. When positioned over core sleeve 24 and plug 26, lock receiver 42 of shell 22 aligns with rocker passage 60 of plug 26 and lock receiver 88 of core sleeve 24. The plurality of openings 44 of shell 22 align with the plurality of openings 45 of core sleeve 24. Towards distal end 46 of lock core 20, core clip 30 is received within circumferential groove 90 of plug 26 and couples plug 26 and core sleeve 24 to shell 22.

The operation of lock core 20 in use with key 32 to unlock handle 12 (FIG. 2) of door 10 (FIG. 2) will be described herein with reference to FIGS. 9A-9C. For the purposes of the disclosure of FIGS. 9A-9C herein, it is assumed that a plurality of pin tumblers of the pin tumbler assembly is positioned within the lock core 20 such that they allow for rotation of plug 26 within shell 22. The description of FIGS. 9A-9C thus describe the operation of rocker 50 and lock actuator assembly 62 for verifying key 32 as having access to unlock door 10 separate from the ability of key 32 to properly position the pin tumblers to allow for relative rotation of plug 26 within shell 22.

Figure 9A:
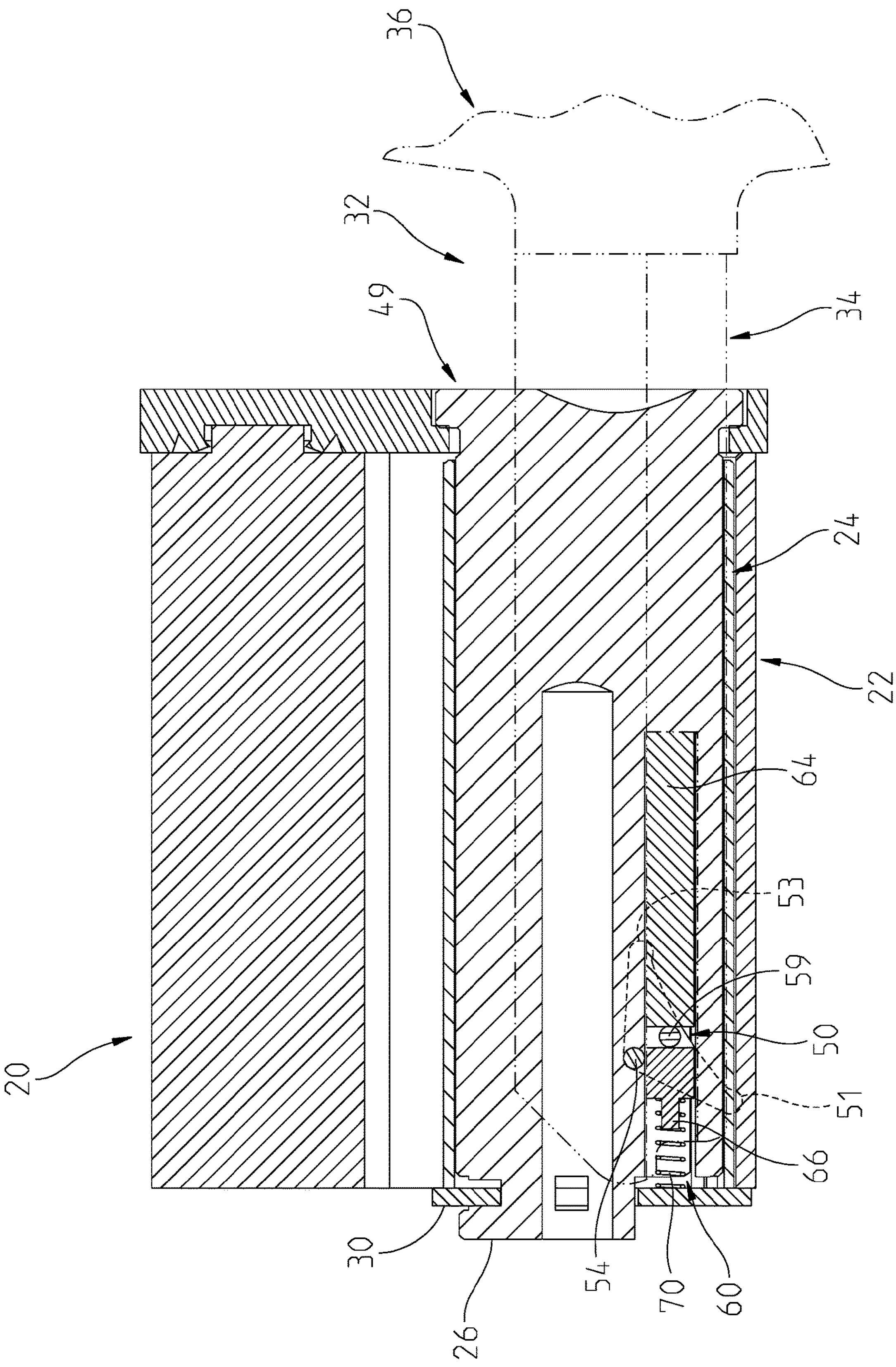
FIG. 9A is a longitudinal cross-section of the interchangeable lock core and key of FIGS. 2-4 in a first configuration.

FIG. 9A is a cross-sectional view of lock core 20. As illustrated, security rod 64 abuts a proximal end of rocker passage 60 due to the biasing force of spring 70. Spring 70 is positioned to abut core clip 30 with spring 70 compressed between block 66 and core clip 30 throughout the range of motion of rocker 50. As previously described with reference to FIG. 8, security rod 64 and block 66 are permitted only for movement along (i.e. coincidental with or parallel to) longitudinal axis L of lock core 20. As such, any motion of security rod 64 will be in a direction relatively distal to the proximal end of rocker passage 60. Since pin 59 is positioned longitudinally between block 66 and security rod 64 within rocker passage 60, the movement of pin 59 is restricted to be along (i.e., coincidental with or parallel to) longitudinal axis L. Further, rocker 50 is restricted to rotational movement about pivot axis X (FIGS. 6,10) due to first arm 52 and second arm 54 of rocker 50 being rotationally supported by openings of plug 26. As security rod 64 is biased by spring 70 to abut the proximal end of rocker passage 60, pin 59 is biased into a position such that first end 51 of rocker 50 extends into lock receiver 42 of shell 22. This position defines one end of a range of motion of rocker 50 wherein first end 51 blocks any rotation of plug 26 relative to shell 22 and rocker 50 is positioned further proximally relative to front surface 49 and proximal end 48 (FIG. 8) of lock core 20 than in any other position along the range of motion.

Figure 9B:
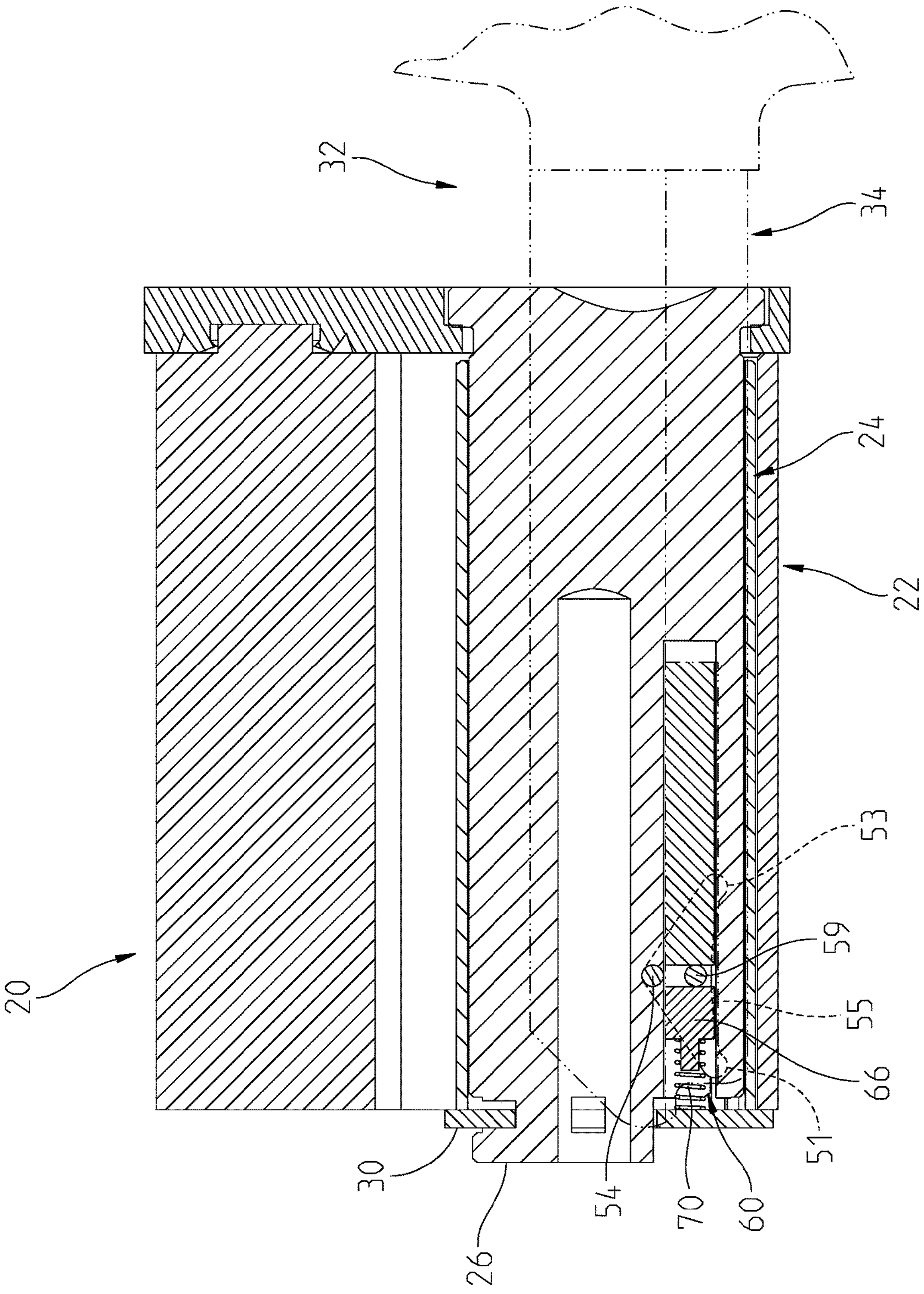
FIG. 9B is a longitudinal cross-section of the interchangeable lock core and key of FIGS. 2-4 in a second configuration.

With reference to FIGS. 9A and 9B, the security rod 64 as illustrated in FIG. 9B is in a position spaced from the proximal end of rocker passage 60, and as such, pin 59 and block 66 have moved distally with respect to the proximal end of rocker passage 60 and their positioning in FIG. 9A. Movement of security rod 64 distally with respect to the proximal end of rocker passage 60 compresses spring 70 further against core clip 30. Additionally, as a result of pin 59 moving distally, rocker 50 pivots to a position that is intermediate within the range of motion of rocker 50. In this position, first and second ends 51, 53 of rocker 50 do not extend through lock receiver 42 and plug 26 is capable of rotation relative to shell 22.

Figure 9C:
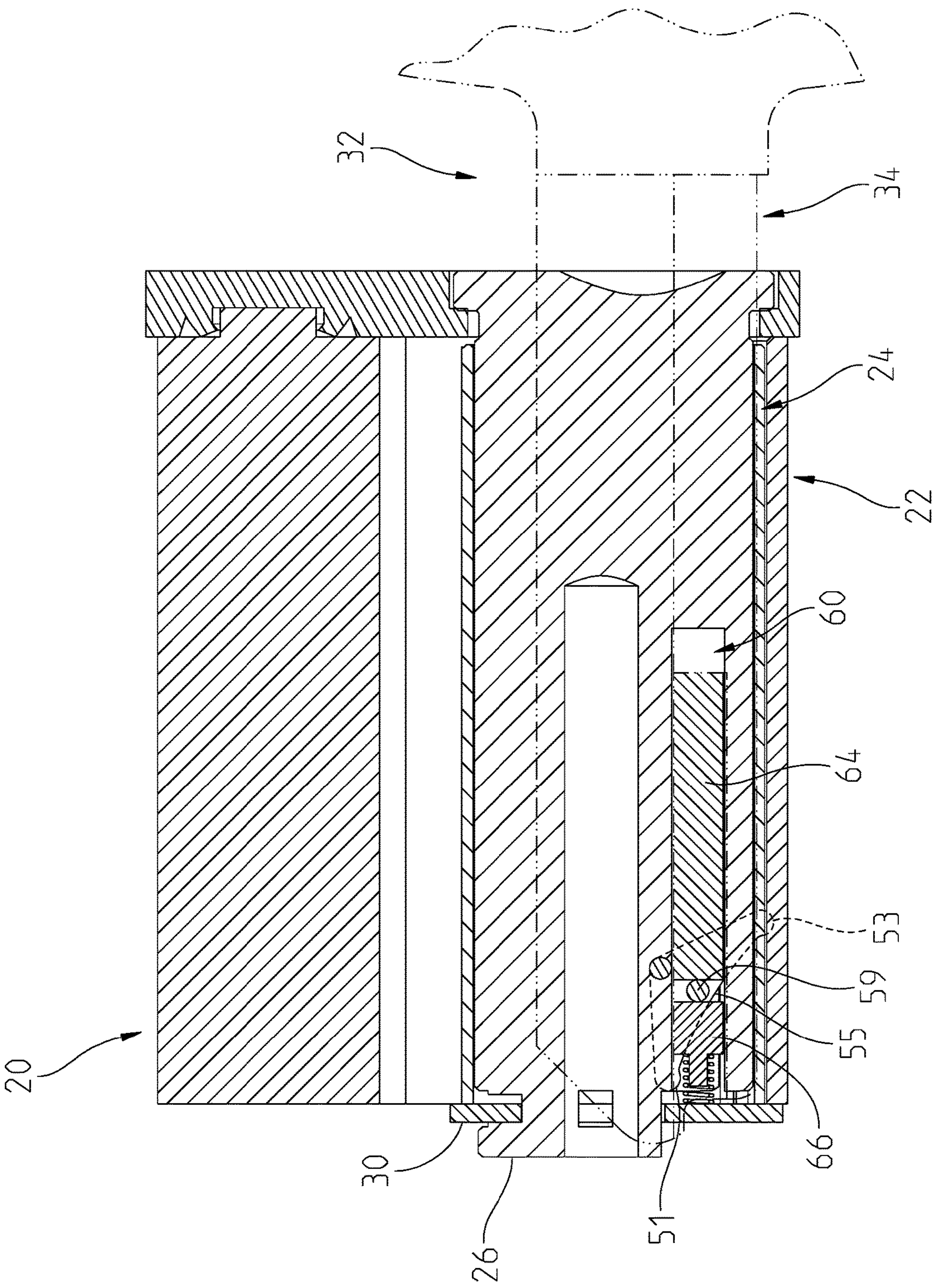
FIG. 9C is a longitudinal cross-section of the interchangeable lock core and key of FIGS. 2-4 in a third configuration.

FIG. 9C illustrates security rod 64 positioned further distally from the proximal end of rocker passage 60 along (i.e. coincidental with or parallel to) longitudinal axis L (spaced further from the proximal end of rocker passage 60 in FIG. 9C than in FIG. 9B). As such, block 66 is positioned further distally in FIG. 9C with respect to the proximal end of rocker passage 60 than the positioning of block 66 as shown in FIG. 9B, and block 66 compresses spring 70 further against core clip 30. Pin 59 is also positioned further distally in comparison with the positioning of pin 59 in FIG. 9B as it positioned between block 66 and security rod 64. Since security rod 64 and block 66 are positioned distally spaced from the proximal end of rocker passage 60, rocker 50 is biased into a position as shown in FIG. 9C, wherein the lock has pivoted about pivot axis X (FIGS. 6, 10) such that second end 53 of rocker 50 extends into lock receiver 42. Plug 26 is thus blocked from rotation relative to shell 22. The positioning illustrated in FIG. 9C defines a second extent or second end of the range of motion of rocker 50 wherein rocker 50 is positioned further distally with respect to proximal end 48 (FIG. 8) of lock core 20 than at any other position along the range of motion. FIGS. 9A-9C thus illustrate the range of motion of rocker 50 and the elements of lock actuator assembly 62 as the components move from one end of range of motion to the opposing end of the range of motion. Actuation of the movement will be described further herein with continued reference to FIGS. 9A-9C.

As illustrated in FIGS. 9A-9C in phantom, key 32 may be inserted into keyway 40 of plug 26 to actuate rocker 50 and lock actuator assembly 62 through the above described range of motions. As previously described with reference to FIGS. 1 and 3-5B, key shank 34 will only be verified access if groove 38 (FIG. 1) and shoulder 39 (FIG. 2) comprise features that properly engage security rod 64 and actuate security rod 64 sufficiently. For example, as a portion of security rod 64 extends into a portion of keyway 40, when inserted, groove 38 of key shank 34 must have a cross-sectional shape that can receive security rod 64 to properly actuate security rod 64. Otherwise, security rod 64 will compress against spring 70 to actuate rocker 50 into a second locked position, as will be described further with reference to FIG. 9C. Additionally, key 32 will not align properly with the pin tumbler assembly, prohibiting rotation of plug 26 relative to shell 22. For example, as illustrated in at least FIG. 8, security rod 64 has a generally square cross section. Groove 38 has a generally triangular cross section that is capable of receiving a portion of security rod 64 and security rod 64 may actuate rocker 50 to an unlocked position, as will be described further with reference to FIG. 9B. In further examples, if groove 38 has a semi-circular cross section and security rod 64 has a circular cross-section, at least a portion of security rod 64 may be received by groove 38 and rocker 50 actuated into the unlocked position. In other examples, if groove 38 and shoulder 39 have a circular cross section and security rod 64 maintains a square cross-section, security rod 64 may not be properly received by groove 38 and thus may not actuate rocker 50 to the unlocked position. Various other cross-sectional shapes may be incorporated with both groove 38 and security rod 64 to allow for engagement.

Additionally, groove 38 (FIG. 2) requires a specific length along key shank 34 in order to engage security rod 64 sufficiently for actuation. Once security rod 64 is received by groove 38 and abuts shoulder 39, key 32 may actuate security rod 64 forward. Security rod 64 is actuated a predetermined and finite amount in order to allow for rocker 50 to be in the unlocked position, as will be described further with reference to FIG. 9B. As such, length 33 (FIG. 4) of groove 38 must be configured to actuate security rod 64 the predetermined amount for placing rocker 50 into the unlocked position. In other words, if length 33 (FIG. 4) of groove 38 is too large, even after fully inserting key 32, shoulder 39 may not engage security rod 64 and security rod 64 will not be actuated. If length 33 (FIG. 4) of groove 38 is too small, insertion of key 32 may engage security rod 64 and actuate it too far within rocker passage 60 and thus out of the unlocked position. These examples will be described further herein with reference to FIGS. 9A-9C.

Referring again to FIG. 9A, rocker 50 is illustrated in a first locked position wherein key 32 has not actuated lock actuator assembly 62. Security rod 64 is longitudinally aligned with pin 59 of rocker 50, which is positioned longitudinally aligned with block 66 and spring 70, and thus sandwiched between security rod 64 and block 66. Spring 70 biases rocker 50 such that the first end 51 of rocker 50 is extending through lock receiver 88 of core sleeve 24 and lock receiver 42 of shell 22. In this way, bottom surface 55 of rocker 50 may be angled relative to longitudinal axis L of lock core 20. With first end 51 of rocker 50 extending through lock receiver 42 of shell 22, first end 51 of rocker 50 blocks rotation of plug 26 relative to shell 22 such that key 32 is not operable to actuate the lock. As such, rocker 50 is in the first locked position and lock core 20 is in a locked state.

With reference still to FIG. 9A, while key 32 is inserted into keyway 40, shoulder 39 of key shank 34 has not engaged security rod 64. This may be as a result of key 32 not being inserted fully and/or length 33 (FIG. 4) of groove 38 being too large or otherwise shaped insufficiently to engage security rod 64. For example, as previously described with reference to FIG. 2, groove 38 and thus shoulder 39 may comprise various cross-sectional shapes in order to engage security rod 64. As illustrated in FIG. 9A, groove 38 comprises a triangular cross-section that is capable for receiving security rod 64. Although, in the positioning of FIG. 9A, key 32 may not be fully inserted into lock core 20, or length 33 (FIG. 4) of groove 38 may be too large and does not allow for engagement between shoulder 39 and security rod 64. As such, shoulder 39 will not actuate security rod 64 to cause rotation of rocker 50. In this configuration, when key shank 34 has an exterior profile corresponding to the pin tumbler assembly such that it actuates pin tumblers of the pin tumbler assembly to be at a shear line, plug 26 will be prohibited from rotation to unlock handle 12 (FIG. 1), due to first end 51 of rocker 50 blocking the rotation of plug 26.

FIG. 9B illustrates rocker 50, and thus lock core 20, in the unlocked position. Rocker 50 is sequentially moveable from the first locked position to the unlocked position through a first movement. This movement is caused by insertion of key 32 shown in phantom into keyway 40 to actuate lock actuator assembly 62. As previously described, groove 38 and thus shoulder 39 of key 32 must be sized and shaped properly to actuate security rod 64. As illustrated in FIG. 9B, groove 38 and shoulder 39 have a cross-section that is capable for receiving security rod 64 within groove 38 and has length 33 (FIG. 4) along key shank 34 that allows for proper engagement with security rod 64 once fully inserted. As such, during insertion of key 32, shoulder 39 of groove 38 engages security rod 64 and actuates security rod 64 against the biasing force of spring 70 in a direction along longitudinal axis L and distal relative to the key shank 34. As security rod 64 is actuated against biasing force of spring 70, pin 59 of rocker 50 is pushed distally in the same direction since pin 59 is positioned between security rod 64 and block 66, and thus spring 70 is compressed further against core clip 30. Rocker 50 therefore rotates, or pivots, such that first end 51 of rocker 50 no longer extends through lock receiver 42 of shell 22 and lock receiver 88 of core sleeve 24. Rocker 50 pivots as a result of first arm 52 and second arm 54 being retained within the first and second openings of plug 26, but pin 59 being capable of movement within rocker passage 60 coinciding with movement of security rod 64. The first movement may be defined as a rotation of rocker 50 about lateral pivot axis X (FIGS. 6, 10), of plug 26, which coincides with the longitudinal axes of first and second arms 52, 54 of rocker 50. Because pivot axis X is perpendicular to (although offset from) longitudinal axis L (FIG. 2) of plug and rocker 50 is not circular with a center coinciding with pivot axis X, rotation of rocker 50 about pivot axis X causes a first movement of rocker 50 having a first vector component in a first direction along (i.e., coincidental with or parallel to) the longitudinal axis L of plug 26, and a second vector component transverse to (but possibly spaced from) the longitudinal axis L of plug 26. Turning to the exemplification of FIGS. 9A and 9B, first end 51 undergoes an exemplary first movement of rocker 50 in that it is positioned at a different position along longitudinal axis L (closer to core clip 30 in the position of FIG. 9B than in the position of FIG. 9A) and a different position transverse to longitudinal axis L (further from 42 as measured perpendicular to longitudinal axis L in FIG. 9B than in FIG. 9A). Because rocker 50 is not circular with a center coinciding with the axis of rotation of rocker 50, it could also be termed a cam.

During the first movement of rocker 50 from the first locked position to the unlocked position illustrated in FIG. 9B, groove 38 is sized and shaped appropriately such that shoulder 39 of key 32 only actuates lock actuator assembly 62 a sufficient distance for pushing security rod 64 until first end 51 of rocker 50 is no longer extending through lock receiver 88 of core sleeve 24 and lock receiver 42 of shell 22, and second end 53 of rocker 50 does not extend through lock receiver 88 of core sleeve 24 and lock receiver 42 of shell 22. As shown in FIG. 9B, this allows for lock receiver 42 of shell 22 to be uninterrupted by rocker 50. Further, in this position, bottom surface 55 of rocker 50 is generally parallel with longitudinal axis L of plug 26. In this embodiment, as previously described, if key shank 34 comprises an exterior profile that effectively engages with the pin tumbler assembly, rotation of key bow 36 causes rotation of plug 26 within lock core 20 relative to shell 22. In this position, handle 12 (FIG. 1) is unlocked and door 10 (FIG. 1) can be opened. In various embodiments, the unlocked position is achieved with a terminal position of key 32, such that key 32 may not be inserted any further into keyway 40 of plug 26 and may only be retracted back out of the keyway 40.

In various embodiments, rocker 50 is sequentially moveable from the unlocked position to a second locked position as illustrated in FIG. 9C through a second movement. The second locked position is different than the first locked position but similarly prohibits rotation of plug 26 relative to shell 22 within lock core 20. The second movement is a result of continued actuation of lock actuator assembly 62, wherein security rod 64 is continuously actuated in distal direction relative to key bow 36. The continued actuation of lock actuator assembly 62 may be as a result of length 33 (FIG. 4) of groove 38 along key shank 34 being too small, such that security rod 64 is continuously actuated after rocker 50 has been positioned in the unlocked position of FIG. 9B. The second movement comprises a first vector component in a first direction along (i.e., coincidental with or parallel to) the longitudinal axis L of plug 26 and a second vector component transverse to (but possibly spaced from) the longitudinal axis L of plug 26. Turning to the exemplification of FIGS. 9B and 9C, second end 53 undergoes an exemplary second movement of rocker 50 in that it is positioned at a different position along longitudinal axis L (closer to core clip 30 in the position of FIG. 9C than in FIG. 9B) and a different position transverse to the longitudinal axis L (extending through lock receiver 42 in comparison to positioned spaced from lock receiver 42 in FIG. 9B). In this position, if key bow 36 is rotated, rotation of plug 26 relative to shell 22 is blocked due to rocker 50 extending through lock receiver 42. As such, rocker 50 is in a second locked position and lock core 20 is in the locked state. In these embodiments, at least a portion of bottom surface 55 may be angled relative to the longitudinal axis L.

As such, the first movement from the first locked position to the unlocked position and the second movement from the unlocked position to the second locked position define a sequential actuation and rotation of rocker 50 about pivot axis X (FIGS. 6, 10) from one end of the range of motion of rocker 50 to the second end of the range of motion of rocker 50.

Figure 10:
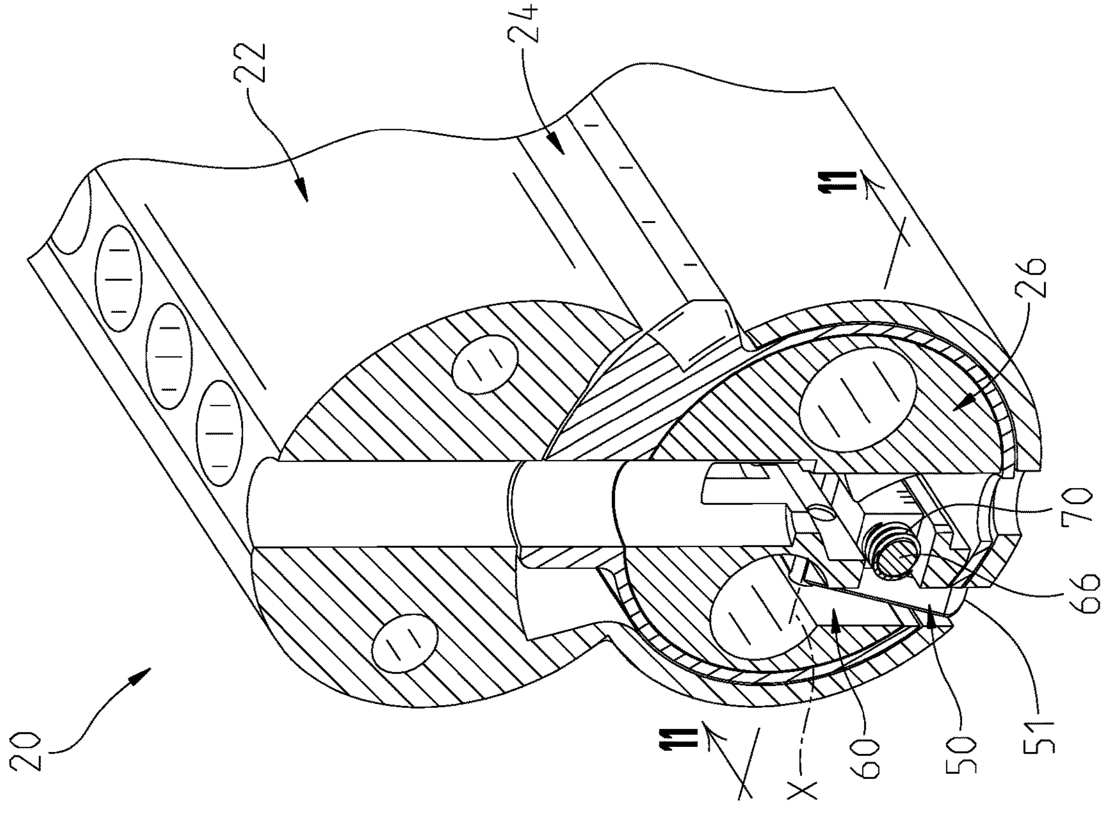
FIG. 10 is a perspective, cross-section of the interchangeable lock core of FIG. 6 taken along line 10-10 thereof.

FIG. 10 is a longitudinal cross-section taken along line 10-10 in FIG. 6 illustrating lock core 20 in the first locked position as shown in FIG. 9A. As shown in FIG. 10 and previously described with reference to FIGS. 2 and 6, plug 26 is positioned within core sleeve 24 and shell 22. Plug 26 comprises rocker passage 60 positioned adjacent keyway 40 with at least a portion of rocker passage 60 having an opening to provide access to keyway 40 such that a portion of security rod 64 extends into keyway 40, as previously described with reference to FIG. 8. As previously described, spring 70 is positioned over a protrusion of block 66 which is positioned adjacent security rod (not shown). Further, rocker 50 is received within rocker passage 60 of plug 26 with first arm 52 and second arm 54 rotatably supported by plug 26 defining pivot axis X extending laterally though plug 26. As illustrated and previously described with reference to FIG. 9A, when lock core 20 is configured in the first locked position, first end 51 of rocker 50 extends through lock receiver 88 of core sleeve 24 and lock receiver 42 the shell 22. This prohibits the ability of plug 26 to rotate within lock core 20 relative to shell 22.

Figure 11:
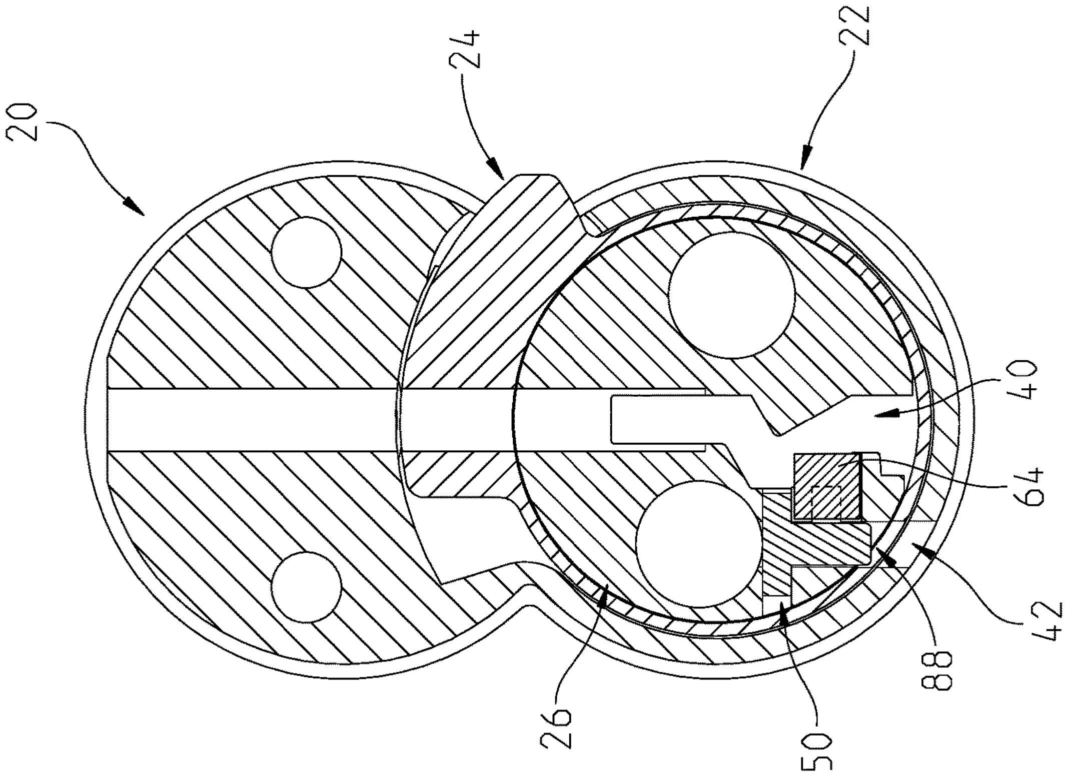
FIG. 11 is an elevational view of the cross-section of FIG. 10.

FIG. 11 is a longitudinal cross-section along line 11-11 of FIG. 10, through pivot axis X (FIG. 10) of plug 26 while rocker 50 is positioned in the first locked position shown in FIG. 9A and FIG. 10. Security rod 64 is illustrated positioned adjacent rocker 50 and supported by a portion of plug 26. Further, pin 59 is shown in phantom extending forward of security rod 64. Security rod 64 has a portion extending into keyway 40 which is the portion that engages with groove 38 (FIG. 2) of key 32 (FIG. 2). In the illustrative embodiment of FIGS. 2 and 11, security rod 64 comprises a generally square cross-sectional profile, but in various embodiments, the cross-sectional profile may include, but is not limited to, circular, ovular, or irregular in shape.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A lock core, comprising:

a shell;

a plug positioned within and rotatable relative to the shell between a first position and a second position about a longitudinal axis of the plug;

a lock, the lock having a first locked position preventing rotation of the plug relative to the shell, an unlocked position allowing rotation of the plug relative to the shell and a second locked position different from the first locked position preventing rotation of the plug relative to the shell, the lock moveable from the first locked position preventing rotation of the plug relative to the shell to the unlocked position with a first movement of the lock, the first movement having a vector component along the longitudinal axis of the plug and a vector component along an axis transverse to the longitudinal axis of the plug; and an actuator configured to engage the lock, wherein engagement of the actuator to the lock causes progressive motion of the lock from the first locked position, then to the unlocked position, and then to the second locked position;

wherein the shell comprises a lock receiver, in the first locked position a first end of the lock extends into the lock receiver, in the unlocked position the lock does not extend into the lock receiver, and in the second locked position a second end of the lock extends into the lock receiver.

2. The lock core of claim 1, wherein the first movement of the lock comprises a rotation about a lateral axis of the lock.

3. The lock core of claim 1, wherein the lock comprises a rocker, wherein the rocker is sequentially rotatable between the first locked position preventing rotation of the plug relative to the shell, the unlocked position allowing rotation of the plug relative to the shell, and the second locked position preventing rotation of the plug relative to the shell.

4. The lock core of claim 1, in combination with a key, the plug further comprising a keyway, the key comprising a shank insertable into the keyway.

5. The lock core of claim 1, wherein the lock is moveable from the unlocked position to the second locked position with a second movement of the lock, the second movement having a second movement vector component along the longitudinal axis of the plug and a second movement vector component along an axis transverse to the longitudinal axis.

6. The lock core of claim 1, wherein the shell includes an upper region having a first cylindrical portion with a first maximum lateral extent, a lower region having a second cylindrical portion with a second maximum lateral extent, and a waist having a third maximum lateral extent, the third maximum lateral extent being less than the first maximum lateral extent and being less than the second maximum lateral extent.

7. A lock core, comprising:

a shell;

a plug positioned within and rotatable relative to the shell between a first position and second position about a longitudinal axis of the plug;

a rocker, the rocker rotatable about a lateral axis of the rocker between:

a first locked position preventing rotation of the plug relative to the shell, an unlocked position allowing rotation of the plug relative to the shell, and a second locked position, different from the first locked position, preventing rotation of the plug relative to the shell; and an actuator positioned within the plug and operatively coupled to the rocker, wherein the unlocked position of the rocker corresponds to an unlocked position of the actuator between a first position of the actuator corresponding to the first locked position of the rocker and a second position of the actuator corresponding to the second locked position of the rocker;

wherein the shell comprises a lock receiver and the plug comprises a lock passage, the rocker being positioned within the lock passage;

wherein the rocker comprises a first end, a second end, and a bottom surface extending between the first and second end; and wherein in the first locked position the first end extends into the lock receiver and the second end does not extend into the lock receiver, in the unlocked position the rocker does not extend into the lock receiver, and in the second locked position the second end extends into the lock receiver and the first end does not extend into the lock receiver.

8. The lock core of claim 7, wherein the shell includes an upper region having a first cylindrical portion with a first maximum lateral extent, a lower region having a second cylindrical portion with a second maximum lateral extent, and a waist having a third maximum lateral extent, the third maximum lateral extent being less than the first maximum lateral extent and being less than the second maximum lateral extent.

9. The lock core of claim 7, wherein the first locked position defines a proximal most position within a range of motion of the rocker relative to a front surface of the plug and the second locked position defines a distalmost position relative to the front surface of the plug within a range of motion of the rocker.

10. The lock core of claim 9, wherein the movement of the rocker from the first locked position to the unlocked position to the second locked position comprises a sequential rotation of the rocker through the range of motion.

11. The lock core of claim 7, wherein the plug comprises a lock passage for receiving the rocker and the lock core comprises a lock actuator assembly, the lock actuator assembly comprising:

a block;

a pin extending from the rocker;

the actuator; and a spring;

the actuator biased by the spring, and wherein actuation of the actuator causes movement of the rocker.

12. The lock core of claim 11, in combination with a key, wherein the plug comprises a keyway for receiving the key, the key comprising a shank comprising a groove, the groove comprising a length that is less than a length of the shank and a cross-section configured for engagement with the actuator of the lock actuator assembly.

13. A method of unlocking a barrier, comprising:

inserting a key into a keyway of a lock core to engage a linear actuator, the inserting step using the linear actuator along a longitudinal axis of the lock core to actuate a lock from a first locked position preventing rotation of a plug within a shell to an unlocked position allowing rotation of the plug within the shell, the lock moveable to a subsequent, second locked position preventing rotation of the plug within the shell, wherein actuating the lock from the first locked position to the unlocked position includes a first movement of the lock, the first movement of the lock having a vector component along the longitudinal axis of the plug and a vector component along an axis transverse to the longitudinal axis of the plug; and rotating the plug within the shell.

14. The method of claim 13, wherein the key comprises a shank having a groove defining a shoulder that engages with a pin of the lock to actuate the lock from the first locked position to the unlocked position during the inserting step.

15. The method of claim 13, wherein the shell comprises an upper region having a first cylindrical portion with a first maximum lateral extent, a lower region having a second cylindrical portion with a second maximum lateral extent, and a waist having a third maximum lateral extent, the third maximum lateral extent being less than the first maximum lateral extent and being less than the second maximum lateral extent.

16. A lock core, comprising:

a shell;

a plug positioned within and rotatable relative to the shell between a first position and a second position about a longitudinal axis of the plug;

a lock, the lock having a first locked position preventing rotation of the plug relative to the shell, an unlocked position allowing rotation of the plug relative to the shell and a second locked position different from the first locked position preventing rotation of the plug relative to the shell, the lock moveable from the first locked position preventing rotation of the plug relative to the shell to the unlocked position with a first movement of the lock, the first movement having a vector component along the longitudinal axis of the plug and a vector component along an axis transverse to the longitudinal axis of the plug;

an actuator configured to engage the lock, wherein engagement of the actuator to the lock causes progressive motion of the lock from the first locked position, then to the unlocked position, and then to the second locked position; and a core sleeve surrounding the plug and received in the shell, the lock extending through a lock receiver in the core sleeve to engage the shell in each of the first locked position of the lock and the second locked position of the lock;

wherein the lock engages the shell in each of the first locked position of the lock and the second locked position of the lock; and wherein the shell includes:

a front face;

a rear face;

an upper region having a first cylindrical portion with a first maximum lateral extent extending from the front face to the rear face;

a lower region having a second cylindrical portion with a second maximum lateral extent extending from the front face to the rear face; and a waist having a third maximum lateral extent extending from the front face to the rear face, the third maximum lateral extent being less than the first maximum lateral extent and being less than the second maximum lateral extent, both the lock and the actuator being positioned within an outer envelope of the shell in each of the first locked position of the lock, the second locked position of the lock, and the unlocked position of the lock.

* * * * *